(12) United States Patent
Angelis et al.

(10) Patent No.: US 8,841,869 B2
(45) Date of Patent: Sep. 23, 2014

(54) MOTOR FOR LINEAR AND ROTARY MOVEMENT

(75) Inventors: Georgo Zorz Angelis, Eindhoven (NL); Hendrikus Martinus Wilhelmus Goossens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 436 days.

(21) Appl. No.: 13/258,012

(22) PCT Filed: Mar. 23, 2010

(86) PCT No.: PCT/IB2010/051248
§ 371 (c)(1),
(2), (4) Date: Sep. 21, 2011

(87) PCT Pub. No.: WO2010/109407
PCT Pub. Date: Sep. 30, 2010

(65) Prior Publication Data
US 2012/0013275 A1      Jan. 19, 2012

(30) Foreign Application Priority Data
Mar. 27, 2009   (EP) .................................... 09156472

(51) Int. Cl.
*H02K 41/02* (2006.01)
*H02K 21/12* (2006.01)
*H02K 41/03* (2006.01)
*H02P 25/06* (2006.01)
*H02K 11/00* (2006.01)

(52) U.S. Cl.
CPC ............... *H02P 25/06* (2013.01); *H02K 21/12* (2013.01); *H02K 41/031* (2013.01); *H02K 2201/18* (2013.01); *H02K 11/0031* (2013.01)

USPC ........... 318/135; 318/115; 318/119; 318/127; 318/128

(58) Field of Classification Search
USPC .......... 318/118, 135, 400.01, 400.02, 400.14, 318/400.15, 400.22, 721, 430, 432, 437, 318/115, 119, 126, 127, 128
See application file for complete search history.

(56) References Cited

U.S. PATENT DOCUMENTS

| 5,982,053 | A | 11/1999 | Chitayat |
| 6,429,611 | B1 * | 8/2002 | Li .................................. 318/115 |
| 7,218,018 | B2 | 5/2007 | Hasegawa et al. |
| 7,235,906 | B2 * | 6/2007 | Carroll et al. ................ 310/90.5 |
| 2005/0264119 | A1 | 12/2005 | Carroll et al. |

FOREIGN PATENT DOCUMENTS

| DE | 10319081 A1 | 12/2004 |
| DE | 102006052455 A1 | 5/2008 |
| EP | 1566879 A1 | 8/2005 |

* cited by examiner

Primary Examiner — Antony M Paul

(57) ABSTRACT

In summary, the present invention relates to a device, a method and a computer program enabling a rotating and translating movement by means of a single motor. An electric motor (102) for linear and rotary movement can comprise a stator (104) having a multi-phase coil arrangement including a number of coils or coil sets and a rotor (106) being movable along a direction of its rotational axis and having a number of poles respectively comprising at least one permanent magnet. A control unit (108) may determine currents based on at least the number of coils or coil sets, an angle of rotation of the rotor and a parameter depending on an axial position of the rotor, and supply the determined currents to the coils or coil sets.

19 Claims, 4 Drawing Sheets

MOTOR FOR LINEAR AND ROTARY MOVEMENT

FIELD OF THE INVENTION

The present invention generally relates to a device, a method and a computer program enabling a rotating and translating movement by means of a single motor.

BACKGROUND OF THE INVENTION

A normal brushless permanent magnet ironless rotating motor or other kind of rotating motor can only deliver torque, i.e. perform a rotating movement. However, in a lot of applications a rotating and translating movement is required. Usually, such rotating and translating movement is made by two motors or a very specific designed motor with complex electronics and control techniques.

U.S. Pat. No. 6,429,611 B1 discloses a combination rotary and linear motor which uses a modified brushless direct current (DC) motor. The motor comprises, among other things, a rotor, a motor casing, and three radially equi-spaced coils mounted to the interior cylindrical surface of the motor casing. An angular position θ of the rotor and a linear position z thereof along its rotation axis (z-axis) are controlled in accordance with command values $\theta_c$ and $z_c$, respectively. This is achieved by driving the coils accordingly. Currents Ia, Ib and Ic supplied to the coils are determined by means of a feedback loop comprising inter alia current sensors for sensing the currents Ia and Ib as well as proportional-integral (PI) controllers.

U.S. Pat. No. 6,429,611 B1 does not disclose an explicit formula for the currents Ia, Ib and Ic supplied to the coils. The currents Ia and Ib are derived by means of a current feedback. Therefore, they have to be sensed by current sensors. Furthermore, PI controllers are needed to implement the feedback loop. These PI controllers are dynamic elements and have to be tuned to make them work. That is, the PI parameters have to be tuned. Thus, a certain amount of electronic and/or software components is needed to operate the combination rotary and linear motor described in U.S. Pat. No. 6,429,611 B1.

SUMMARY OF THE INVENTION

It is an object of the present invention to enable a translating and rotating movement without the need for a specific designed motor or complex electronics and control techniques.

This object can be achieved by a device according to claim 1, a method according to claim 10 and a computer program according to claim 11.

Accordingly, in a first aspect of the present invention a device is presented. The device may comprise: an electric motor for linear and rotary movement comprising a stator having a multi-phase coil arrangement including a number of coils or coil sets and a rotor being movable along a direction of its rotational axis and having a number of poles respectively comprising at least one permanent magnet; and a control unit configured to determine currents based on at least the number of coils or coil sets, an angle of rotation of the rotor and a parameter depending on an axial position of the rotor, and to supply the determined currents to the coils or coil sets. The device enables to generate a torque and an axial force, even substantially independent of one another and on the basis of a standard motor. Thus, a translating and rotating movement can be implemented without the need for a specific designed motor or complex electronics and control techniques. In this way, one may save on an extra motor or a difficult design path. Thus, time and money can be saved.

In a second aspect of the present invention the device may comprise: a first sensor configured to sense the angle of rotation and supply it to the control unit; and a second sensor configured to sense the axial position of the rotor and supply it to the control unit. A commutation algorithm based on the values sensed by the first and second sensors can be implemented. In this way, currents to be supplied to the coils or coil sets may be determined such that the torque and the axial force can be generated largely independent of each other (decoupled) at all times. This may be possible without a feedback of the currents, i.e. without a current sensor. Thus, there can be no feedback loop comprising controllers and also no effort for controller tuning. The second aspect may be combined with the first aspect.

In a third aspect of the present invention the device can comprise: a bearing system configured to bear the rotor and constrain all degrees of freedom except for a linear degree of freedom along the rotational axis and a rotational degree of freedom around the rotational axis. Thus, an unintentional movement in another degree of freedom may be prevented. The third aspect can be combined with any one of the preceding aspects.

In a fourth aspect of the present invention based on the third aspect the bearing system may be an active magnetic bearing system. Such bearing system can be contactless and, therefore, frictionless.

In a fifth aspect of the present invention the parameter can change inverse proportional as a function of the axial position. A parameter depending on the axial position enables to determine the currents to be supplied to the coils or coil sets as a function of the axial position. In this way, a significant axial working range may be achieved. The fifth aspect can be combined with any one of the preceding aspects.

In a sixth aspect of the present invention the control unit may be configured to determine the currents based also on a further parameter that is independent of the axial position. Thus, e.g. a current component for generating a torque can be determined based on the parameter and, therefore, dependent on the axial position of the rotor, while a current component for generating an axial force may be determined based on the further parameter and, therefore, independent of the axial position of the rotor. The sixth aspect can be combined with any one of the preceding aspects.

In a seventh aspect of the present invention the control unit may be configured to determine a current for a first coil or coil set as $Ir=Irphi+Irx=A*\sin(n*(phi-theta))+B*\cos(n*(phi-theta))$, a current for a second coil or coil set as $Is=Isphi+Isx=A*\sin(n*(phi-theta)-2*pi/(3*n))+B*\cos(n*(phi-theta)-2*pi/(3*n))$ and a current for a third coil or coil set as $It=-Ir-Is=Itphi+Itx=A*\sin(n*(phi-theta)+2*pi/(3*n))+B*\cos(n*(phi-theta)+2*pi/(3*n))$, wherein A is the parameter depending on the axial position, n is a number of magnet pole pairs, phi is the angle of rotation, theta is an alignment angle between 0 and $2*pi/n$, and B is a further parameter. The currents for the first to third coils or coil sets can be determined by means of explicit calculation formulas. No current feedback is required. Thus, no current sensors for sensing the currents are needed. The seventh aspect may be combined with any one of the preceding aspects.

In an eighth aspect of the present invention the electric motor can be an ironless electric motor. Such ironless electric motor may have less moment of inertia in comparison with an electric motor provided with an iron core and, therefore, enable an improved controllability. The eighth aspect can be combined with any one of the preceding aspects.

In a ninth aspect of the present invention the electric motor may be a direct current electric motor. The revolutions per minute of such direct current electric motor can be substantially independent of a frequency of its power supply, in contrast to the revolutions per minute of an alternating current motor. The ninth aspect may be combined with any one of the preceding aspects.

In a tenth aspect of the present invention a method for controlling an electric motor for linear and rotary movement is presented. The method can comprise: determining currents based on at least a number of coils or coil sets of a stator of the electric motor, an angle of rotation of a rotor of the electric motor and a parameter depending on an axial position of the rotor; and supplying the determined currents to the coils or coil sets. The method enables to control the electric motor such that a torque and an axial force may be generated, even substantially independent of one another and on the basis of a standard motor. Thus, a translating and rotating movement can be implemented without the need for a specific designed motor or complex electronics and control techniques. In this way one may save on an extra motor or a difficult design path. Thus, time and money can be saved.

In an eleventh aspect of the present invention a computer program is presented. The computer program may comprise program code means for causing a computer to carry out the steps of a method according to the tenth aspect when the computer program is carried out on a computer. Thus, the same advantages as with the method according to the tenth aspect can be achieved.

Further advantageous modifications are defined in the dependent claims.

BRIEF DESCRIPTION OF THE DRAWINGS

These and other aspects of the present invention will be apparent from and elucidated by an embodiment described hereinafter with reference to the accompanying drawings, in which.

DETAILED DESCRIPTION OF AN EMBODIMENT

Figure 1:
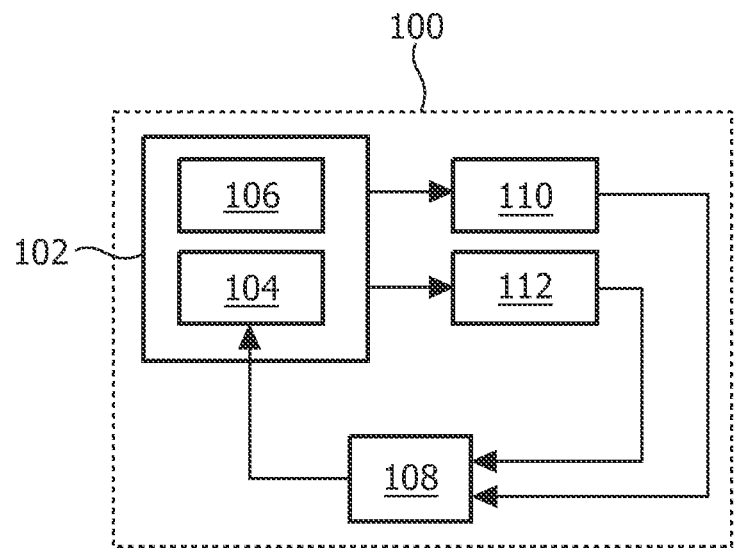
FIG. 1 shows a schematic block diagram illustrating an arrangement of an exemplary device according to the embodiment.

FIG. 1 shows a schematic block diagram illustrating an arrangement of an exemplary device 100 according to the embodiment. The device 100 can comprise an electric motor 102 including a stator 104 and a rotor 106, for example a substantially cogging free and especially ironless electric motor such as e.g. an ironless direct current (DC) motor. The stator 104 may comprise a multiple of three coils (3, 6, 9, . . . ). The rotor 106 can be a permanent magnet rotor. The electric motor 102 may be an ironless magnetic rotating motor such as e.g. a brushless permanent magnet ironless rotating motor or other kind of rotating motor. Such motor can be easily made from an off-the-shelf motor. That is, a standard motor may be adapted from a 1-dimensional application to a 2-dimensional application.

The device 100 can further comprise a control unit 108, a first sensor 110 and a second sensor 112. The control unit 108 may determine currents to be supplied to coils or coil sets of the stator 104. The first sensor 110 can sense an angle of rotation of the rotor 106. The second sensor 112 may sense an axial position or displacement of the rotor 106.

Figure 2:
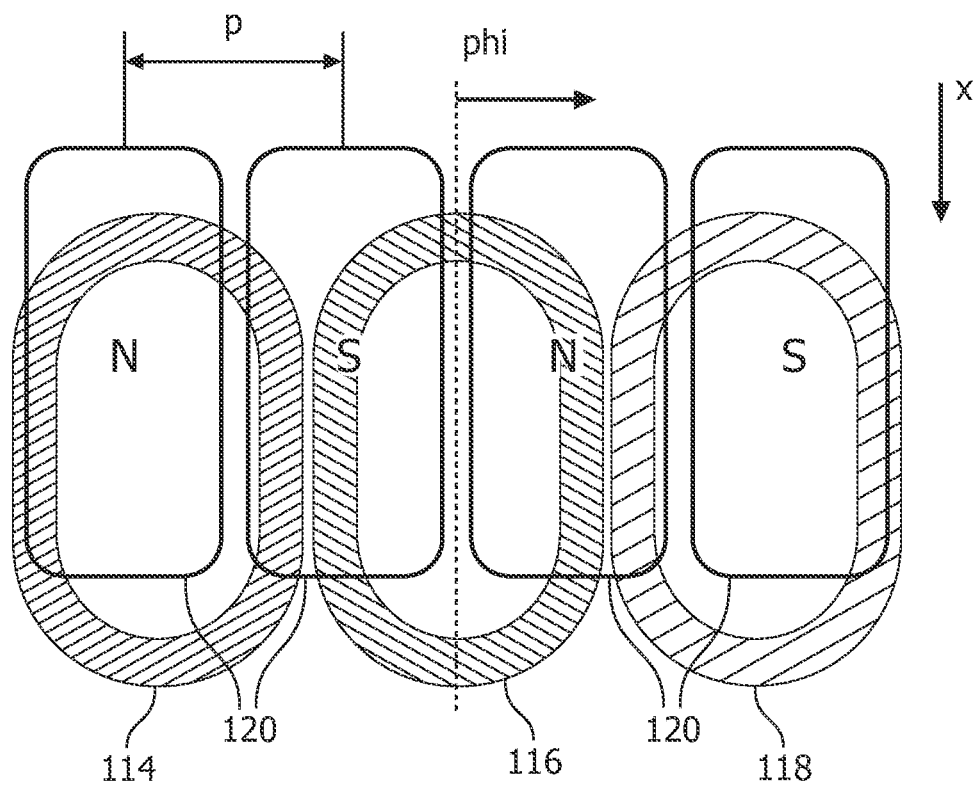
FIG. 2 shows a schematic diagram illustrating a configuration of coils and poles in the exemplary device.

FIG. 2 shows a schematic diagram illustrating a configuration of coils and poles in the exemplary device 100. Such depiction can be obtained by cutting up the electric motor 102 on one side along the axis and folding it open. The stator 104 may have a multi-phase coil arrangement including a number of coils or coil sets. In the exemplary device 100 the stator 104 can comprise a first coil or coil set 114, a second coil or coil set 116 and a third coil or coil set 118. While single first to third coils 114, 116 and 118 are shown in FIG. 2, there may also be respective coil sets. As the electric motor 102 of the exemplary device 100 can be a three-phase motor, there may be a multiple of three coils.

The rotor 106 can have a number of poles 120. These poles 120 may respectively comprise at least one permanent magnet. In the configuration illustrated in FIG. 2, there are four poles respectively comprising a permanent magnet. A double-headed arrow denoted by p indicates a pitch between the poles 120, i.e. a magnet pitch. It can be expressed as $p=pi/n$, wherein n may indicate a number of magnet pole pairs. An arrow denoted by phi indicates an angle of rotation of the rotor 106 in radians (rads), i.e. an angular position of the rotor 106 or displacement along the circumference. An arrow denoted by x indicates a displacement of the rotor 106 along a rotational axis thereof and also indicates a direction of the rotational axis.

Figure 3:
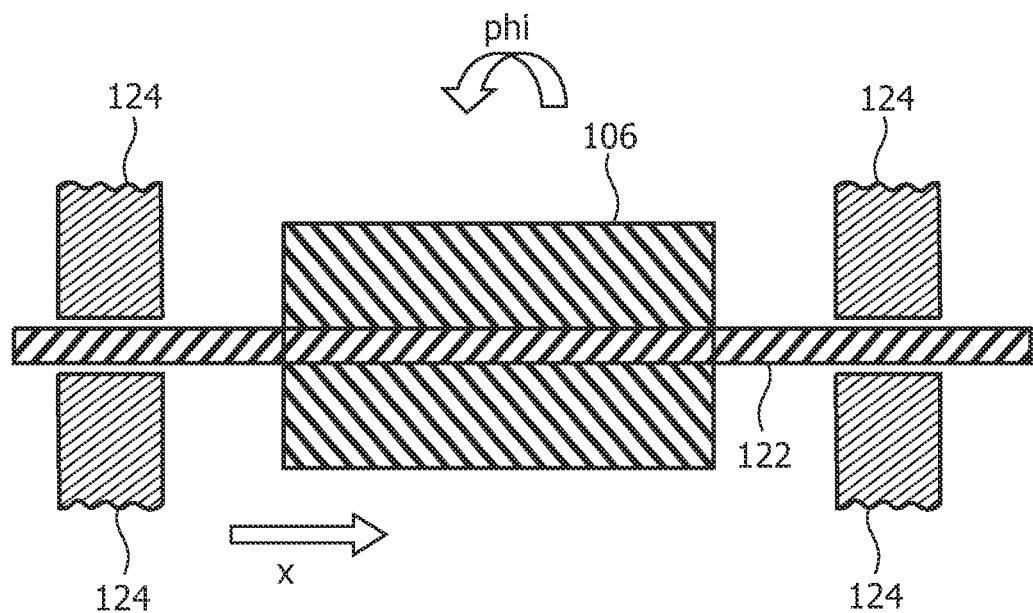
FIG. 3 shows a schematic cross section of a bearing system and a rotor in the exemplary device.

FIG. 3 shows a schematic cross section of a bearing system 124 and the rotor 106 in the exemplary device 100. The rotor 106 can rotate around a rotational axis 122. The rotor 106 may be borne by the bearing system 124, i.e. the rotational axis 122 thereof can be guided or borne by the bearing system 124. The bearing system 124 may constrain all degrees of freedom except for a linear degree of freedom along the rotational axis 122 and a rotational degree of freedom around the rotational axis 122. The bearing system 124 can be e.g. an active magnetic bearing system.

Figure 4:
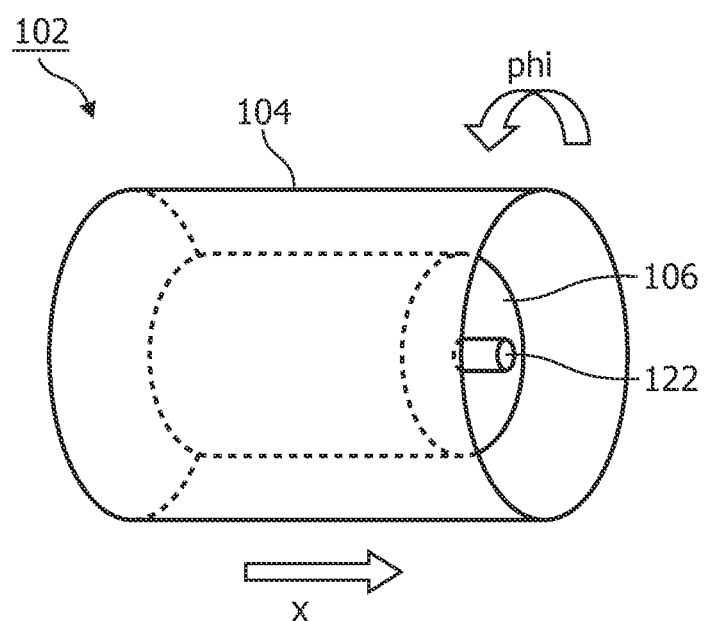
FIG. 4 shows a schematic diagram of an electric motor in the exemplary device in a first operating state.

FIG. 4 shows a schematic diagram of the electric motor 102 in the exemplary device 100 in a first operating state. As illustrated in FIG. 4, the rotor 106 may be positioned in the centre of the coils of the stator 104, usually a multiple of three (3, 6, 9, . . . ). The end effects of these coils can balance out in this way.

Figure 5:
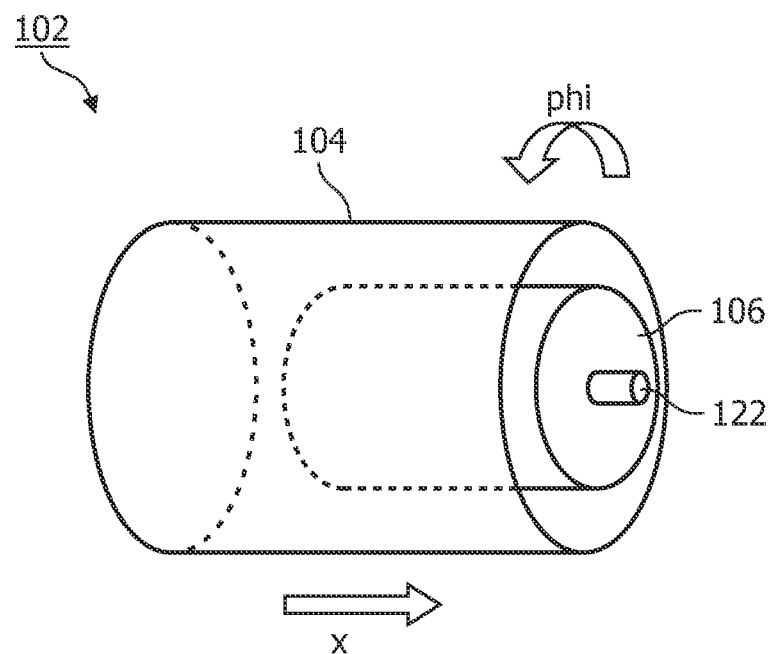
FIG. 5 shows a schematic diagram of an electric motor in the exemplary device in a second operating state.

FIG. 5 shows a schematic diagram of the electric motor 102 in the exemplary device 100 in a second operating state. As illustrated in FIG. 5, the rotor 106 can be shifted along the rotational axis 122. As a result, the end effects of the coils may not balance out anymore, but increase. For a normal rotating motion and/or a torque, three correlated currents can be applied to the appropriate coils. By applying a different set of correlated currents, an axial force due to the end effects of the coils may become dominant. That is, the position shift of the rotor 106 enables to exert an x-force such as e.g. a restoring force. If all is done right, the torque and the axial force can be steered substantially independent of each other. This is described in more detail below.

As mentioned above, there may be three coils (or a multiple of three coils) 114, 116 and 118 in the electric motor 102 or another three-phase motor. A current for each of the three coils or coil sets 114, 116 and 118 can be derived from a position of the rotor 106. That is, currents to be supplied to the coils or coil sets 114, 116 and 118 may be determined by the control unit 108 based on an angle of rotation of the rotor 106. The angle of rotation of the rotor 106 can be sensed by the first sensor 110.

A current for the first coil or coil set 114 may be denoted by Ir. A current for the second coil or coil set 116 can be denoted by Is. A current for the third coil or coil set 118 may be denoted by It. Each of these currents Ir, Is and It can comprise two respective portions or components. That is, the currents Ir, Is and It may be determined or calculated according to the following equations:

$$Ir = Irphi + Irx \qquad (1)$$

$$Is = Isphi + Isx \qquad (2)$$

$$It = Itphi + Itx \qquad (3)$$

Irphi, Isphi and Itphi can be current components for generating a torque, i.e. a force Fphi in phi direction, and Irx, Isx and Itx may be current components for generating an axial force, i.e. a force Fx in x direction. These components can be determined or calculated according to the following equations:

$$Irphi = A * \sin(n*(phi-theta)) \qquad (4)$$

$$Isphi = A * \sin(n*(phi-theta) - 2*pi/(3*n)) \qquad (5)$$

$$Itphi = -Irphi - Isphi = A * \sin(n*(phi-theta) + 2*pi/(3*n)) \qquad (6)$$

$$Irx = B * \cos(n*(phi-theta)) \qquad (7)$$

$$Isx = B * \cos(n*(phi-theta) - 2*pi/(3*n)) \qquad (8)$$

$$Itx = -Irx - Isx = B * \cos(n*(phi-theta) + 2*pi/(3*n)) \qquad (9)$$

In the above equations, A may be a parameter that can be dependent on the axial position x of the rotor 106 and a required torque, and independent of the angle of rotation of the rotor 106. That is, Irphi=A(x)*sin(n*(phi−theta)), Isphi=A(x)*sin(n*(phi−theta)−2*pi/(3*n)) and Itphi= A(x)*sin(n*(phi−theta)+2*pi/(3*n)) may apply. The axial position of the rotor 106 can be sensed by the second sensor 112.

The value n may indicate a number of magnet pole pairs. The value phi can indicate the angle of rotation of the rotor 106 in radians (rads), i.e. the angular position of the rotor 106 or displacement along the circumference. The value theta may indicate an alignment angle aligning a commutation angle with a magnetic angle of a magnetic field in a magnetic track of the electric motor 102. The alignment angle can take a value between 0 and 2*pi/n. B may be a further parameter that can be independent of both the axial position of the rotor 106 and the angle of rotation thereof, and dependent on a required force.

As apparent from the equations (4) to (6), the relation between the currents may be a phase shift of two times the magnet pitch p divided by three times the number n of magnet pole pairs. After an alignment procedure phi is said to be zero at a point where Fphi is a maximum. In this situation, Fx can be zero. If the relation between angular position and current is shifted over 2*p/(n*4), currents as calculated according to the equations (7) to (9) may be obtained. In this situation, Fphi can be zero and Fx may be a maximum.

The current sets defined by the equations (4) to (6) on the one hand and by the equations (7) to (9) on the other hand can be added (sines and cosines). The result may be a mix between Fphi and Fx. For example, a resultant force F can be determined or calculated according to the following equation:

$$F = C * Fphi + D * Fx = C * Fphi(Irphi, Isphi, Itphi) + D * Fx(Irx, Isx, Itx) \qquad (10)$$

Fphi and Fx may be controlled substantially independent of each other. Thus, the electric motor 102 can deliver not only a torque but also a force along its axis, wherein the torque and the axial force may be set substantially independent of each other. An additional commutation can be provided for that purpose.

Figure 6:
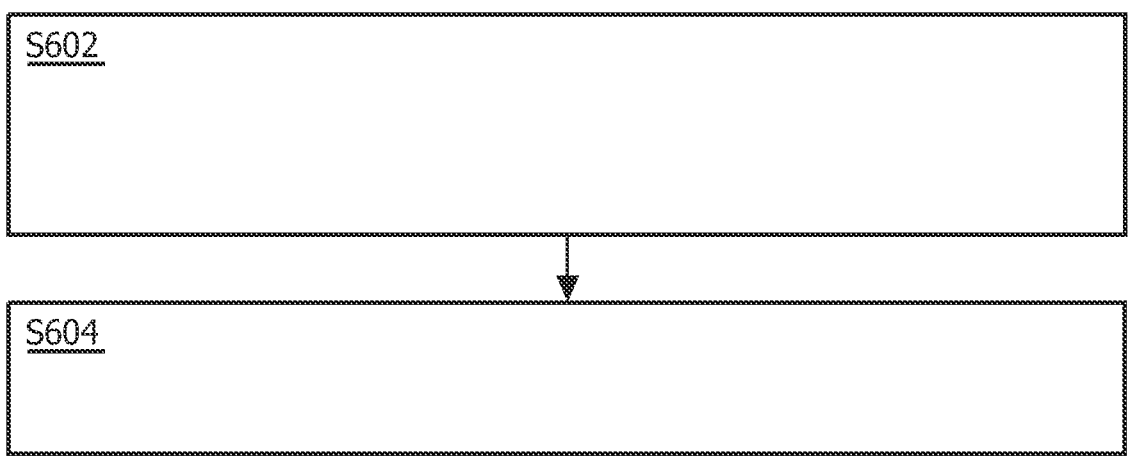
FIG. 6 shows a flowchart illustrating basic steps of an exemplary method for controlling an electric motor for linear and rotary movement according to the embodiment.

FIG. 6 shows a flowchart illustrating basic steps of an exemplary method for controlling an electric motor for linear and rotary movement according to the embodiment. In a step S602, currents can be determined based on at least a number of coils or coil sets of a stator of the electric motor, an angle of rotation of a rotor of the electric motor and a parameter depending on an axial position of the rotor. In a step S604, the determined currents may be supplied to the coils or coil sets.

Figure 7:
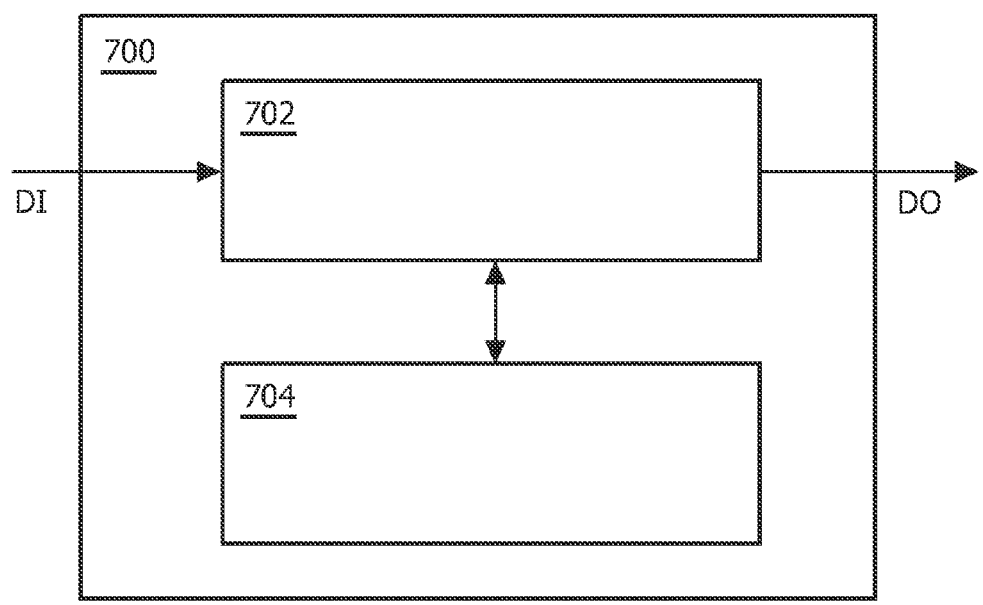
FIG. 7 shows an example of a software-based implementation of the embodiment.

FIG. 7 shows an example of a software-based implementation of the embodiment. Here, a device 700 can comprise a processing unit (PU) 702, which may be provided on a single chip or a chip module and which can be any processor or computer device with a control unit that performs control based on software routines of a control program stored in a memory (MEM) 704. Program code instructions may be fetched from the MEM 704 and loaded into the control unit of the PU 702 in order to perform processing steps such as those described in connection with FIG. 6. The processing steps can be performed on the basis of input data DI and may generate output data DO. The input data DI may represent e.g. configuration and operation data of an electric motor, etc., and the output data DO can represent e.g. currents to be supplied to coils or coil sets of the electric motor, etc.

The above described device, method and computer program may be applied to actuators that can be used e.g. in pick-and-place machines, chirurgical drills, focus and zoom motors in photo and video equipment, car transmissions, compact disc (CD) and digital versatile disc (DVD) players, etc.

The above described device, method and computer program enable to generate a torque and an axial force, even substantially independent of one another and on the basis of a standard motor. Thus, a translating and rotating movement may be implemented without the need for a specific designed motor or complex electronics and control techniques. In this way, one can save on an extra motor or a difficult design path. A commutation algorithm based on values sensed by first and second sensors may be implemented. Hence, currents to be supplied to coils or coil sets can be determined such that a torque and an axial force may be generated largely independent of each other (decoupled) at all times. This can be possible without a feedback of the currents, i.e. without a current sensor. Thus, there may be no feedback loop comprising controllers and also no effort for controller tuning.

In summary, the present invention relates to a device, a method and a computer program enabling a rotating and translating movement by means of a single motor. An electric motor for linear and rotary movement can comprise a stator having a multi-phase coil arrangement including a number of coils or coil sets and a rotor being movable along a direction of its rotational axis and having a number of poles respectively comprising at least one permanent magnet. A control unit may determine currents based on at least the number of coils or coil sets, an angle of rotation of the rotor and a parameter depending on an axial position of the rotor, and supply the determined currents to the coils or coil sets.

While the present invention has been illustrated and described in detail in the drawings and foregoing description, such illustration and description are to be considered illustrative or exemplary and not restrictive. The invention is not limited to the disclosed embodiment. For example, while it is described above that the control unit 108 may determine currents to be supplied to coils or coil sets of the stator, i.e. motor currents, this can also be done by other hardware such as e.g. analogue hardware. Such hardware may be e.g. a power amplifier for the motor currents. One embodiment can be where 2 Hall sensors are used to measure the position dependent magnetic field of the magnet. These sensors may be spatially 90 degrees apart, and the positions of the sensors with respect to the coils can be fixed (and known). The 2 Hall signals may be fed to the analogue device that can be part of the power amplifier. These Hall signals may be sinusoidal as a function of the rotation angle (phi). A sum of linear combination of these two signals (phase shifted) can give the desired motor currents. In general, rotational position information may enter the analogue device together with desired force and torque set points, based on which the desired currents for the different motor coils can be determined. Other hardware than that described above may also be used alternatively or additionally in order to determine the desired currents.

Variations to the disclosed embodiment can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

A computer program capable of controlling a processor to perform the claimed features can be stored/distributed on a suitable medium, such as an optical storage medium or a solid-state medium supplied together with or as part of other hardware, but may also be distributed in other forms, such as via the Internet or other wired or wireless telecommunication systems. It can be used in conjunction with a new system, but may also be applied when updating or upgrading existing systems in order to enable them to perform the claimed features.

A computer program product for a computer can comprise software code portions for performing e.g. processing steps such as those described in connection with FIG. 6 when the computer program product is run on the computer. The computer program product may further comprise a computer-readable medium on which the software code portions are stored, such as e.g. an optical storage medium or a solid-state medium.

Any reference signs in the claims should not be construed as limiting the scope thereof.

The invention claimed is:

1. A device comprising:
an electric motor for linear and rotary movement comprising a stator having a multi-phase coil arrangement including a number of coils or coil sets and a rotor being movable along a direction of its rotational axis and having a number of poles respectively comprising at least one permanent magnet; and
a control unit configured to determine currents based on at least said number of coils or coil sets, an angle of rotation of said rotor and a parameter depending on an axial position of said rotor, and to supply said determined currents to said coils or coil sets
the control unit being further configured to determine the currents based on a further parameter independent of the axial position and angle of rotation of said rotor.

2. The device according to claim 1, further comprising:
a first sensor configured to sense said angle of rotation and supply it to said control unit; and
a second sensor configured to sense said axial position of said rotor and supply it to said control unit.

3. The device according to claim 1, comprising a bearing system configured to bear said rotor and constrain all degrees of freedom except for a linear degree of freedom along said rotational axis and a rotational degree of freedom around said rotational axis.

4. The device according to claim 3, wherein said bearing system is an active magnetic bearing system.

5. The device according to claim 1, wherein said parameter changes in inverse proportion to said axial position.

6. The device according to claim 1, wherein said control unit is configured to determine said currents based also on a further parameter that is independent of said axial position.

7. The device according to claim 1, wherein said control unit is configured to determine a current for a first coil or coil set as $Ir=Irphi+Irx=A*\sin(n*(phi-theta))+B*\cos(n*(phi-theta))$, a current for a second coil or coil set as $Is=Isphi+Isx=A*\sin(n*(phi-theta)-2*pi/(3*n))+B*\cos(n*(phi-theta)-2*pi/(3*n))$ and a current for a third coil or coil set as $It=-Ir-Is=Itphi+Itx=A*\sin(n*(phi-theta)+2*pi/(3*n))+B*\cos(n*(phi-theta)+2*pi/(3*n))$, and wherein A is said parameter depending on said axial position, n is a number of magnet pole pairs, phi is said angle of rotation, theta is an alignment angle between 0 and 2*pi/n, and B is a further parameter.

8. The device according to claim 1, wherein said electric motor is an ironless electric motor.

9. The device according to claim 1, wherein said electric motor is a direct current electric motor.

10. The device according to claim 1, wherein said control unit is configured to determine said currents based also on a further parameter that is independent of said axial position.

11. The device according to claim 1, wherein said electric motor is an ironless electric motor.

12. The device according to claim 1, wherein said electric motor is a direct current electric motor.

13. A method for controlling an electric motor for linear and rotary movement, comprising:
determining currents based on at least a number of coils or coil sets of a stator of said electric motor, an angle of rotation of a rotor of said electric motor and a parameter depending on an axial position of said rotor (S602) and based on a further parameter independent of the axial position and angle of rotation of said rotor and
supplying said determined currents to said coils or coil sets (S604).

14. A non-transitive computer readable media encoded with control instructions for causing a computer to carry out the steps of a method according to claim 13 when said control instructions are carried out on a computer.

15. A device comprising:
an electric motor for linear and rotary movement comprising a stator having a multi-phase coil arrangement including a number of coils or coil sets and a rotor being movable along a direction of its rotational axis and having a number of poles respectively comprising at least one permanent magnet; and a control unit configured to determine currents based on at least said number of coils or coil sets, an angle of rotation of said rotor and a parameter depending on an axial position of said rotor, and to supply said determined currents to said coils or coil sets, the device further comprising a bearing system configured to bear said rotor and constrain all degrees of freedom except for a linear degree of freedom along said rotational axis and a rotational degree of freedom around said rotational axis.

16. The device according to claim 15, further comprising:
a first sensor configured to sense said angle of rotation and supply it to said control unit; and
a second sensor configured to sense said axial position of said rotor and supply it to said control unit.

17. The device according to claim 15, wherein said bearing system is an active magnetic bearing system.

18. The device according to claim 15, wherein said parameter changes in inverse proportion to said axial position.

19. The device according to claim 15,
wherein said control unit is configured to determine a current for a first coil or coil set as $$Ir = Irphi + Irx = A*\sin(n*(phi-\theta)) + B*\cos(n*(phi-\theta)),$$

a current for a second coil or coil set as $$Is = Isphi + Isx = A*\sin(n*(phi-\theta)-2*pi/(3*n)) + B*\cos(n*(phi-\theta)-2*pi/(3*n)) \text{ and}$$

a current for a third coil or coil set as $It = -Ir - Is = Itphi + Itx = A*\sin(n*(phi-\theta)+2*pi/(3*n)) + B*\cos(n*(phi-\theta)+2*pi/(3*n))$, and wherein A is said parameter depending on said axial position, n is a number of magnet pole pairs, phi is said angle of rotation, theta is an alignment angle between 0 and 2*pi/n, and B is a further parameter.

* * * * *